ates Patent [11] 3,617,393

[72] Inventors Tadamitsu Nakazawa
 Kawasaki-shi;
 Hiroshi, Makishima, Yokohama-shi;
 Toshio Shinohara, Yokahama-shi; Yukio
 Kawahara, Yokohama-shi, all of Japan
[21] Appl. No. 864,874
[22] Filed Oct. 8, 1969
[45] Patented Nov. 2, 1971
[73] Assignee Dai Nippon Toryo Kabushiki Kaisha
 Osaka, Japan

[54] PRETREATMENT BEFORE ELECTROPHORETIC PAINTING
 4 Claims, No Drawings
[52] U.S. Cl. .................................................. 148/6.15 Z,
 148/6.17, 204/181
[51] Int. Cl. ...................................................... C23f 7/10
[50] Field of Search ............................................ 148/6.15 Z;
 204/181; 106/14

[56] References Cited
 UNITED STATES PATENTS
 3,203,835 8/1965 Blum .............................. 148/6.15 Z
 3,218,200 11/1965 Henricks ........................ 148/6.15 Z
 3,395,052 7/1968 Yonezaki et al. .............. 148/6.15 Z
 3,454,483 7/1969 Freeman ........................ 204/181
 3,467,589 9/1969 Rausch et al. ................. 148/6.15 X
 FOREIGN PATENTS
 381,494 10/1964 Switzerland .................. 148/6.15 (Z)

Primary Examiner—Julius Frome
Assistant Examiner—David A. Jackson
Attorney—Waters, Roditi, Schwartz & Nissen ABSTRACT: When a metal surface treating agent consisting of a zinc phosphate comprising given amounts of water-soluble aluminum, arsenic and fluorine compounds added thereto is employed as pretreatment before electrophoretic painting, the dissolving quantity of the phosphating coating is reduced, and it results in formation of a uniform electrodeposition-coated film which has excellent corrosion resistance and is free from rough surface; moreover, as the paint is not contaminated, the paint can be stable for a long time. Finish of the electrodeposition coating can be also improved by using pretreatment prepared by adding further a small amount of Te and/or Bi.

PRETREATMENT BEFORE ELECTROPHORETIC PAINTING

The present invention relates to improvement in pretreatment before electrophoretic painting.

It has been widely known that car bodies or parts of electric appliances are painted by an electrophoretic method in a painting bath comprising water-soluble or water-dispersable resins. The electrophoretic painting method possesses numerous advantages such as a reduction in the loss of paint on painting, production of articles which are stable due to uniform painting, and painting of fine parts of articles due to the good throwing power of the paint; while, on the other hand, some defects arise which have not been seen in the ordinary painting methods (such as dipping and spraying): that is, when a material to be painted which has been treated with an ordinary zinc phosphate coating is painted by an electrophoretic method, due to the nonelectroconductive phosphate coating formed on the said material, there are caused such phenomena as loss of gloss, reduction of the coating thickness and rough surface following an uneven phosphate coating surface (as paint is applied uniformly on any part in an electrophoretic method).

Furthermore, in electrophoretic painting, the material to be painted is put in the positive side to be painted, dissolution of the material cannot be avoided on painting. According to this phenomenon, the phosphate coating chemically converted for improvement of corrosion resistances is dissolved and thus damaged, and results in a decrease of corrosion resistance; there are also caused color change of a coated film and deterioration of the properties of the paint due to residual dissolving materials in the coated film and contamination of the painting bath.

The present invention relates to a metal surface treating agent particularly one for use before electrophoretic painting which eliminates the above-described defects in the ordinary conversion coating.

The object of the present invention is to provide a surface-treating agent which has excellent corrosion resistance, does not affect the gloss and the coating thickness, is free from rough surface, and also causes less dissolution of the phosphated coating.

Compared with performing an electrophoretic painting on an ordinary conversion coating, the use of the present metal surface treating agent improves the gloss and the thickness, and increases the corrosion resistance, and is able to apply the paint coating stable for a long time as the paint is not contaminated: when using the metal surface treating agent of the present invention, as the electroconductivity of the conversion coating is increased, the thickness and the gloss of the paint coating are increased, and there can be obtained uniform painting since uneven conversion-coated surface does not affect the surface of the paint coating. The stability of the paint is increased because the chemically converted coating does not dissolve on painting, and it results in stable painting for a long period of time, accompanied with increased gloss and thickness of the coating: the corrosion resistance is much higher than that obtained by an ordinary chemical conversion treatment.

The surface-treating agents most widely used are those of zinc phosphate or the ones of zinc phosphate to which aluminum or arsenic compounds are added. (U.S. Pat. No. 3,203,835 and U.S. Pat. No. 3,146,133) These known treating agents are quite useful as surface-treating agents used in ordinary painting methods such as dipping and spraying, but when used in an electrophoretic method, the above-described defects are caused, as will be shown below in comparative examples. There is also known a treating agent for electrophoretic painting which is prepared by adding fluorine ions (British Pat. No. 1,040,806), but it cannot overcome the above-described defects.

In the present invention a metal surface treating agent is prepared by adding compounds of aluminum, arsenic and fluorine in given amounts to a treating agent of the zinc phosphate series as a pretreating agent for electrophoretic painting for eliminating the above-described defects.

The pretreating solution of the present invention is prepared by adding to (A) a solution of zinc phosphate comprising 1–10 g./l. Zn ion, 5–20 g./l. of $PO_4$ ion, 2–15 g./l. $NO_3$ ion, and 0.1–2.0 g./l. Na ion, and if necessary, 0.1–1.0 g./l. of a metal ion (Ni, Co, Cu, or Fe 7 (B) an oxidant which is of 0.5–10 g./l. $ClO_3$ ion or 0.01–1.0 g./l. $NO_2$ ion, and (C) a component consisting of 0.02–0.3 g./l., preferably 0.05–0.2 g./l. Al ion, 0.01–0.4 g./l. preferably 0.1–0.3 g./l. As ion and 0.02–2.0 g./l., preferably 0.5–1.0 g./l. F ion, and adding water to make up to 1,000 cc. The ordinary zinc phosphate coating consists of a mixture of $Zn_3(PO_4)_2 \cdot 4H_2O$ and $FeHPO_4 \cdot 2H_2O$ and comprises mainly crystalline $Zn_3(PO_4)_2 \cdot 4H_2O$, and consequently the coating is nonelectroconductive. Accordingly, in the electrophoretic painting, as the electric current flows through fine gaps in the said largely electric-resistant coating of zinc phosphate formed on the electroconductive substrate to electrodeposit the paint, finish of the paint coating is much deteriorated.

The coating composition formed in the treating solution of the present invention includes iron oxides such as $Fe_3O_4$, $\gamma Fe_2O_3$, and FeO as well as the above-described constituents, and they cause an increase of electroconductivity of the coating. The mechanism has not been resolved theoretically, but according to the results of X-ray diffraction and chemical analysis of the coating composition, the said iron oxide is recognized to compose a part of the composition. As the coating itself becomes tight because of electroconductive iron oxide inserted into the gaps of $Zn(PO_4) \cdot 4H_2O$ crystals, its corrosion resistance is improved, and simultaneously the finish of the paint coating is also improved due to good electrophoretic painting properties of the paint, and further, the dissolving amount of the coating is reduced on painting.

On the contrary, when performing chemical conversion treating with a treating solution comprising a zinc phosphate treating agent and As ions, F ions or Al ions added thereto alone, crystalline $Zn_3(PO_4)_2 \cdot 4H_2O$ and $FeHPO_4 \cdot 2H_2O$ are coexisting as a mixture in the formed coating, and on performing the electrophoretic painting, the formed coating is greatly dissolved and results in reduction of corrosion resistance and contamination of the electrodeposition bath, since these crystals are nonelectroconductive. 2.0/min.), Steel plates were chemically converted with the agents described in example 4 and comparative example 6 and tested with X-ray diffraction (Cu-anode 30 kvp, 15 ma.: Counter, GMC 1500: Scan Speed, 2.0/min.), and as the result there was hardly recognized any crystalline material other than $Zn_3(PO_4)_2 \cdot 4H_2O$ in each case. According to the chemical analysis, the following results were obtained.

|  | Example 4 | Comparing Example 6 |
| --- | --- | --- |
| Zn | 23.5% | 40.3% |
| Fe | 13.4% | 3.2% |
| $PO_4$ | 33.5% | 45.2% |

Considering these results, it is seen that the chemically converted coating of the present invention comprised a considerable amount of Fe ions, and also contained a considerable much amount of noncrystalline substances which could not be recognized in X-ray diffraction, as well as the crystalline ones observed in X-ray diffraction.

According to the above-described results, is is seen that the main component of the coating formed by the treating solution of the present invention is $Zn_3(PO_4)_2 \cdot 4H_2O$, similarly as in an ordinary treating solution; the observation of black color in the conversion coating according to the present invention suggests that Fe ions will exist as iron oxide of $Fe_3O_4$, $\gamma Fe_2O_3$ or FeO rather than of $FeHOP_4 \cdot 2H_2O$. As the causes there may be considered the following:

1. the black compound recognized to be formed in the coating cannot be a compound of zinc and zinc phosphate is colorless:
2. iron phosphates are colorless, except $FeHOP_4 \cdot 2H_2O$ (yellow):

3. as the produced black iron compound, only iron oxide ($Fe_3O_4$, $Fe_2O_3$ or $FeO$) can be suggested.

The substances mainly consisting of iron oxide such as iron phosphate coating, black oxide coating, and scale part of a steel plate has excellent electroconductivity on electrophoretic painting, and it proves good electroconductivity of the chemically converted coating of the present invention. As a highly electroconductive iron oxide is inserted in the gaps of crystalline $Zn_3(PO_4)_2 \cdot 4H_2O$, the coating becomes tight, and simultaneously due to the good conductivity of iron oxide, the coating is formed to be superior in electroconductivity, thickness, tightness, and corrosion resistance to the ordinary chemically converted coating.

Iron oxides such as $Fe_3O_4$, $\gamma Fe_2O_3$ and $FeO$ which seldom exist in the ordinary coating are formed in the coating in the present invention, perhaps due to existence of As ion, Al ion and F ion in the treating solution of the invention, which will serve as catalyst of an oxidant: that is, they are supposed to catalystic activities as coexisting with chloric acid ion, nitrous acid ion, or nitric acid ion of the oxidant in the treating solution.

As the compounds which form Al ion in the water and which are used in the composition of the present invention, there are such as aluminum phosphate, aluminum sulfate, aluminum carbonate, aluminum hydroxide, aluminum acetate, and aluminum fluorate. The compounds which farm fluorine ions are such as sodium fluoride sodium silicofluoride, sodium fluoborate, ammonium bifluoride, and ammonium fluoride. The compounds which farm As ions are such as sodium arsenate, potassium arsenate, arsenic acid, sodium arsenite, and arsenous acid. The compounds are, however, not restricted to the above-described ones, and there may be employed any compounds which farm Al ions, F ions and As ions in water.

Another practical example of the present invention provides a treating agent prepared by adding 0.01–0.1 g./l. Te ion and/or 0.01–0.1 g./l. Bi ion to the above-described mixed solution consisting of zinc phosphate treating agent (A), an oxidant (B) and (C). A material to be painted is treated by spraying, brushing, or dipping with the said treating agent for 2–7 minutes at 45°–70° C., and the thus formed coating possesses improved electroconductivity, which has been a defect of the ordinary chemically converted coating, and moreover the finish of paint coatings improved even on a considerably thick coating; the corrosion resistance is increased, and the dissolving amount of the formed coating on electrophoretic painting is reduced: there can be obtained numerous advantages as described above, which are unexpected with the ordinary formed coating, and simultaneously, there are obtained such advantages as an increase of the stability of the treating solution and reduction of the sludge produced on the chemical conversion treatment.

The suitable compounds which form the above-described Te ions and Bi ions may be $K_2TeO_4 \cdot 5H_2O$, $KTeF_5$, $KHTeO_4 \cdot \frac{1}{2}H_2O$, $Na_2H_4TeO_6$, $LiTeO_4 \cdot H_2O$, $(NH_4)HTe_2O_7$, $(NH_4)HTeO_4$, $Bi(NO_3)_3 6H_2O$, and $Bi_4(P_2O_7)_3$.

The invention is more precisely explained according to the following examples.

EXAMPLE 1

| | |
|---|---|
| Zinc oxide | 6.5 g. |
| 75% phosphoric acid | 20.0 g. |
| 62% nitric acid | 6.0 g. |
| Sodium chlorate | 8.5 g. |
| Nickelous nitrate hexahydrate | 2.0 g. |
| Aluminum phosphate | 0.5 g. |
| Sodium fluoride | 0.7 g. |
| Sodium arsenate | 0.8 g. |
| Water | Residue |
| | 1,000 cc. |

A solution prepared by dissolving 30 grams of above solution mixture in the water to make up to 1,000 cc. was employed. A steel plate (JIS-G-3141) was degreased, water-rinsed, and then dipped in the above solution at 70° C. for 10 minutes, followed by water-rinsing and drying. Five parts by weight of a water-soluble melamine resin, Cymel No. 301 (a trade name, manufactured by American Cyanamid Co.; nonvolatile matter 98 percent) were added to 2.5 parts by weight of titanium oxide JR-600 (a trade name, manufactured by Teikoku Kako Co.) 90 parts by weight of a water-soluble acrylic resin ABD-8 (a trade name, manufactured by Nippon Carbide Co.; nonvolatile matter, 50 percent) and then deionized water was added to make the nonvolatile matter 12.5 percent; ammonia was added to adjust the pH to 8.5. In the thus prepared paint, the above-degreased steel plate was dipped as a positive electrode to perform electrophoretic painting with a voltage of 60 v., an electrode ratio of 1:1 and a current-applying time of 2 minutes; then, it was baked at 160° C. for 30 minutes and tested.

EXAMPLE 2

| | |
|---|---|
| Zn ion | 12.5 g. |
| $PO_4$ ion | 14.00 g. |
| $NO_3$ ion | 10.00 g. |
| $NO_2$ ion | 0.03 g. |
| Al ion | 0.04 g. |
| As ion | 0.10 g. |
| F ion | 0.05 g. |
| Na ion | 0.01 g. |
| Water | Residue |
| | 1,000 cc. |

The steel plate degreased as in example 1 was treated with the above solution at 50° C. for 3 minutes by spraying. The water-soluble resin varnished is prepared by adding 85 parts of water-soluble maleinised oil (prepared by adding 16 parts of maleic anhydride to 85 parts of linseed oil, and after reacting for 5 hours, neutralizing by diethylamine) and 15 parts of water-soluble methylol melamine resin MW-32. Then said converted steel plate was dipped in a paint enamel prepared from 20 parts of said water-soluble resin varnish, 1.0 part of Asahi Carbon No. 50 (a trade name, manufactured by Asahi Carbon Co.), and 20 parts of titanium oxide JR-600 (a trade name, manufactured by Teikoku Kako Co.), and distilled with deionized water to adjust at NV 13 percent; after performing electrophoretic painting at 80 v. for 3 minutes, the paint was baked at 150° C. for 30 minutes.

EXAMPLE 3

| | |
|---|---|
| Zn ion | 4.2 g. |
| $PO_4$ | 5.5 g. |
| $NO_3$ | 4.0 g. |
| $ClO_3$ | 1.0 g. |
| Na | 0.2 g. |
| Al | 0.08 g. |
| As | 0.2 g. |
| F | 0.9 g. |
| Water | Residue |
| | 1,000 cc. |

A steel plate degreased as in example 1 was treated with the above solution at 55° C. for 3 minutes by spraying. Then, it was painted as described in example 1.

EXAMPLES 4–7

The steel plates degreased as in example 1 were treated under the conditions shown in the following table.

| Example 4 | G. | Example 5 | G. | Example 6 | G. | Example 7 | G. |
|---|---|---|---|---|---|---|---|
| Zn ion | 15.2 | Zn ion | 4.8 | Zn ion | 5.2 | Zn ion | 3 |
| $PO_4$ | 19 | $PO_4$ | 10.0 | $PO_4$ | 14 | $PO_4$ | 8 |
| $NO_3$ | 14 | $NO_3$ | 3.5 | $NO_3$ | 3 | $NO_3$ | 2 |
| $ClO_3$ | 10 | $NO_2$ | 0.1 | $NO_2$ | 0.42 | $NO_2$ | 4 |
| Na | 2.0 | Na | 0.02 | $NO_2$ | 0.05 | $CO_3$ | 1.0 |
| Al | 0.3 | Al | 0.1 | Al | 0.2 | Al | 0.5 |
| As | 0.4 | As | 0.2 | As | 0.09 | As | 0.1 |
| F | 1.0 | F | 0.3 | F | 0.8 | F | 0.6 |
| Water residue | | Te | 0.08 | Bi | 0.08 | Bi | 0.05 |
| | | Water residue | | Water residue | | Te | 0.05 |
| | | | | | | Water residue | |
| 1,000 cc. Immersion at 60° C. for 5 minutes | | 1,000 cc. Spraying at 50° C. for 2 minutes | | 1,000 cc. Spraying at 55° C. for 2 minutes | | 1,000 cc. Immersion at 60° C. for 5 minutes | |

The comparative examples shown below were performed for comparing with the treating solutions according to the present invention; steel plates degreased as in example 1 were treated under the conditions listed in the following table.

| C. Ex. 1 | G. | C. Ex. 2 | G. | C. Ex. 3 | G. | C. Ex. 4 | G. | C. Ex. 5 | G. | C. Ex. 6 | G. |
|---|---|---|---|---|---|---|---|---|---|---|---|
| Zn ion | 6.65 | Zn ion | 5.8 | Zn ion | 2.3 | Zn ion | 4.9 | Zn ion | 4.1 | Zn ion | 5.3 |
| $PO_4$ | 29.7 | $PO_4$ | 10.5 | $PO_4$ | 5.9 | $PO_4$ | 8.4 | $PO_4$ | 9.2 | $PO_4$ | 12.4 |
| $NO_3$ | 3.9 | $NO_3$ | 4.2 | $NO_3$ | 1.8 | $NO_3$ | 3.4 | $NO_3$ | 2.3 | $NO_3$ | 2.5 |
| $ClO_3$ | 8.5 | $NO_2$ | 0.25 | $NO_2$ | 0.07 | $ClO_3$ | 3.2 | $NO_2$ | 0.25 | $NO_2$ | 0.3 |
| As | 0.19 | Na | 0.34 | Na | 0.18 | Na | 0.8 | Na | 0.10 | Na | 0.2 |
| Ni | 1.84 | Al | 0.2 | Ni | 0.3 | Al | 0.1 | Al | 0.08 | F | 0.75 |
| Water residue | | Water residue | | F | 0.13 | F | 0.2 | As | 0.2 | As | 2.3 |
| | | | | Water residue | | Water residue | | Water residue | | Water residue | |
| Total 1,000 cc. Spraying at 60° C. for 2 minutes | | 1,000 cc. Spraying at 55° C. for 3 minutes | | 1,000 cc. Spraying at 55° C. for 1 minute | | 1,000 cc. Spraying at 60° C. for 2 minutes | | 1,000 cc. Spraying at 55° C. for 3 minutes | | 1,000 c.c Immersion at 60° C. for 5 minutes | |

In comparative examples 1–6, electrophoretic painting was performed with the same paint under the same conditions as employed in example 1 in order to compare the results with those obtained according to the present invention: similar results were obtained in electrophoretic painting with other water-soluble or water-dispersable resin paints such as epoxy-esters, alkyds, and phenols and under different conditions:

| | Gloss *1 | Thickness of coating($\mu$) *2 | Salt spraying test, *3 mm. | Solubility on electrophoretic painting (g./m.$^2$) *4 | Initial current (A./dm.$^2$) *5 |
|---|---|---|---|---|---|
| Ex.: | | | | | |
| 1 | 45 | 25 | 1 | 0.20 | 0.53 |
| 2 | 35 | 28 | 1 | 0.13 | 0.57 |
| 3 | 40 | 24 | 1 | 0.15 | 0.51 |
| 4 | 42 | 23 | 1 | 0.20 | 0.54 |
| 5 | 46 | 27 | 1 | 0.18 | 0.53 |
| 6 | 45 | 26 | 1 | 0.10 | 0.54 |
| 7 | 47 | 28 | 1 | 0.15 | 0.56 |
| C. Ex.: | | | | | |
| 1 | 20 | 13 | 4 | 0.75 | 0.41 |
| 2 | 40 | 18 | 12 | 0.40 | 0.38 |
| 3 | 16 | 14 | 7 | 0.80 | 0.35 |
| 4 | 21 | 17 | 6 | 1.22 | 0.40 |
| 5 | 23 | 19 | 6 | 1.18 | 0.39 |
| 6 | 20 | 15 | 8 | 1.32 | 0.37 |

*1. According to JIS K 5400-6-4.
*2. By "Kett" thickness meter.
*3. After spraying of 3 percent salt solution for 100 hours, cellophane tape of 12 mm. width was plastered on the cut part of the paint-coating surface, and peeled off; the width of the peeled surface was measured.
*4. The weight of a chemically converted soft steel plate was measured by an analytical balance, and after electrophoretic painting, the paint was dissolved by xylol and removed; after drying the plate was again weighed by the balance to calculate the dissolved amount from the weight loss.
*5. Determination of the initial current on the electrophoretic painting.

As clearly seen in the above results, the paint coating obtained by electrophoretic painting after treating with the surface-treating agent of the present invention was superior in gloss, thickness of the coating, and corrosion resistance as compared to the known ones. Moreover, the solubility of the chemically converted coating on electrophoretic painting was very low.

The difference in the initial current greatly influences the thickness of the paint coating, the state of the surface and the gloss. Considering the said fact, it was recognized that the coating formed by the present invention possessed the electroconductivity higher than that of the coating produced by the ordinary zinc phosphate treating solution.

What we claim is:

1. A process for the pretreatment of an iron or steel surface to render said surface suitable for electrophoretic painting which process consists of:
   Treating said surface with a composition consisting of:
      a solution consisting of:
         a. 1–10 g./l. Zn ion,
         b. 5–20 g./l. $PO_4$ ion,
         c. 2–15 g./l. $NO_3$ ion,
         d. 0.1–20 g./l. Na ion,
         e. 0.5–10 g./l. $CiO_3$ ion, or 0.01–1.0 g./l. $NO_2$ ion,
         f. 0.02–0.3 g./l. Al. ion
         g. 0.01–0.4 g./l. As ion, and
         h. 0.02–2.0 g./l. F ion
      and, rinsing said surface so coated with water.

2. The process of claim 1 wherein the aluminum ion is present in the amount of 0.05–0.2 g./l., the arsenic ion is present in the amount of 0.1–0.3 g./l. and the flouride ion is present in the amount of 0.5–1.0 g./l.

3. A process for the pretreatment of an iron or steel surface to render said surface suitable for electrophoretic painting, which process consists of:
   Treating said surface with a composition consisting of:
      A solution consisting of:
         a. 1–10 g./l. Zn ion
         g. 5–20 g/l. $PO_4$ ion
         c. 2–15 g./l. $No_3$ ion,
         d. 0.1–2.0 g./l. Na ion,
         e. 0.05–10 g./l. $ClO_3$ ion, or 0.01–1.0 g./l. $NO2$ ion,
         f. 0.02–0.3 g./l. Al ion
         g. 0.01–0.4 g./l. As ion,
         h. 0.02–2.0 g./l. F ion, and
         i. 0.01–0.1 g./l. of a constituent selected from the group consisting of Te ion, Bi ion and mixtures thereof,
      and rinsing said iron or steel so coated with water.

4. The process of claim 3 wherein the aluminum ion is present in the amount of 0.05–0.2 g./l. the arsenic ion is present in the amount of 0.1–0.3 g./l. and the fluorine ion is present in the amount of 0.5–1.0 g./l.

* * * * *